United States Patent [19]

Anthony

[11] Patent Number: 4,901,538
[45] Date of Patent: Feb. 20, 1990

[54] PORTABLE TEMPERATURE MAINTENANCE SYSTEM

[76] Inventor: James Anthony, #17 Rockinghorse Rd., Rancho Palos Verdes, Calif. 90274

[21] Appl. No.: 218,564

[22] Filed: Jul. 13, 1988

[51] Int. Cl.⁴ ............................................. F25D 15/00
[52] U.S. Cl. ..................................... 62/237; 62/263; 62/449; 98/6
[58] Field of Search ...................... 62/263, 259.1, 237, 62/299, 448, 449; 98/2.02, 6, DIG. 7

[56] References Cited

U.S. PATENT DOCUMENTS

| | | | |
|---|---|---|---|
| 2,303,867 | 12/1942 | Stebbins | 62/237 X |
| 2,538,382 | 1/1951 | Reilly | 62/237 |
| 3,360,954 | 1/1968 | Snider et al. | 62/259.1 |
| 3,777,506 | 12/1973 | Hergatt et al. | 62/448 X |
| 4,632,019 | 12/1986 | Whiteman | 62/237 X |

FOREIGN PATENT DOCUMENTS 2175383  5/1985  United Kingdom .................. 98/119

Primary Examiner—William E. Tapolcai
Attorney, Agent, or Firm—Bruce A. Jagger

[57] ABSTRACT

A portable temperature maintenance system for maintaining a desired temperature in a cargo container. The system includes a lightweight panel for releaseable attachment to the opening of a cargo container, a refrigeration unit separate from the lightweight member, and flexible conduits for conducting vapor between the cargo container and the refrigeration unit in a substantially closed looped system.

7 Claims, 2 Drawing Sheets

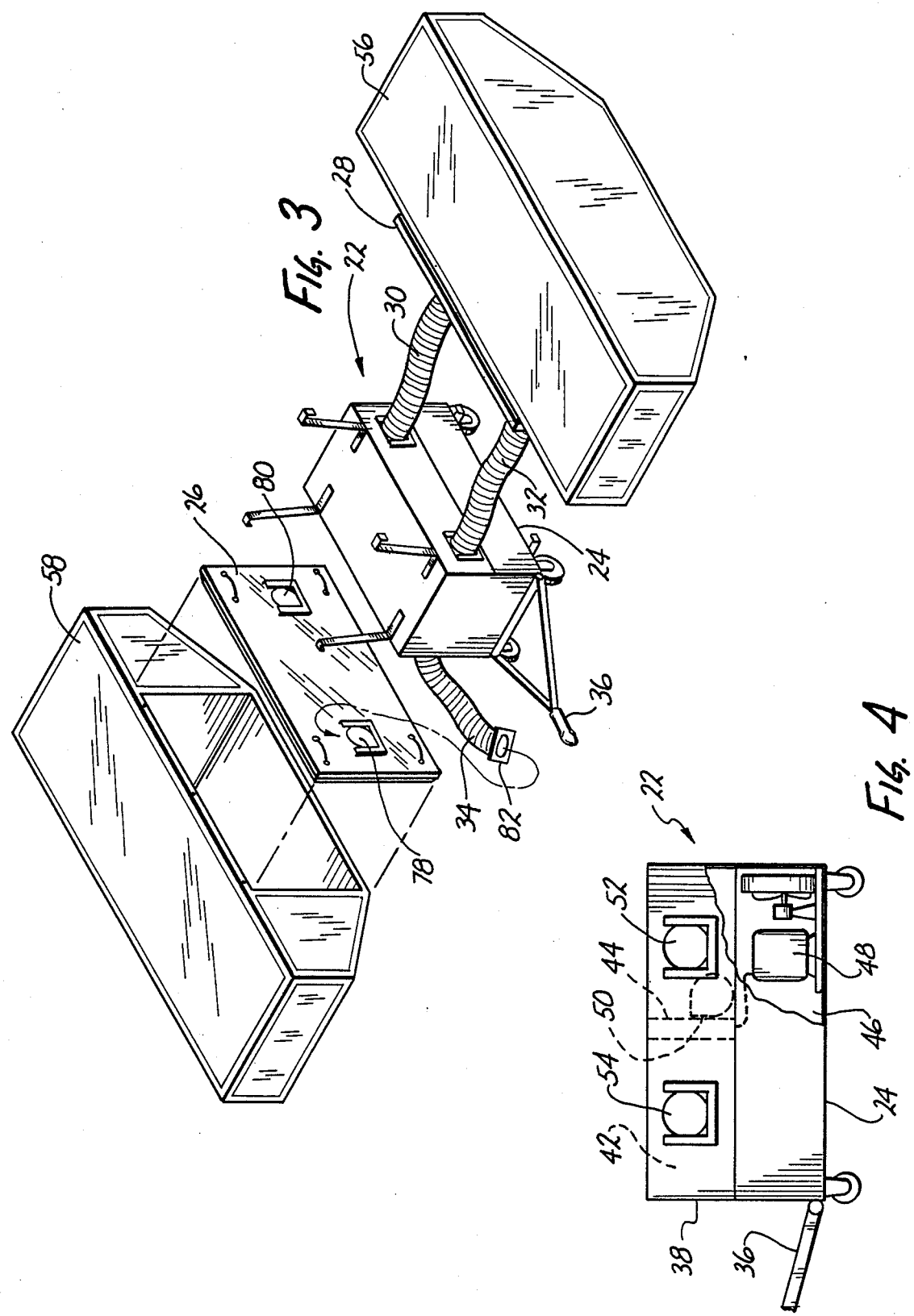

PORTABLE TEMPERATURE MAINTENANCE SYSTEM

BACKGROUND OF THE INVENTION

The present invention relates to portable temperature maintenance systems and particularly to portable refrigeration systems which are adapted for transportation to and use with chambers and particularly insulated chambers such as insulated cargo containers.

Previously considerable difficulty had been experienced in maintaining a desired temperature in insulated chambers, particularly cargo containers, where the chamber is not provided with its own temperature regulating equipment. Many perishable products are shipped over long distances and must be stored for brief periods of time while in transit. This is a particularly serious problem where air freight is involved. Air cargo containers do not include tbheir own temperature regulating systems because the added weight would make them prohibitively expensive. The cargo does not generally require refrigeration while airborne. Perishable cargos such as fruits or other produce may be damaged very quickly, however, when the cargo container is parked for a few hours outside the aircraft on the tarmac where the temperature may exceed 100 degrees Fahrenheit. It is often not economical to provide a fixed storage unit for air freight cargo containers at the airport. Often the capacity, particularly at smaller airports, provided by the storage facility is not utilized much of the time. While the storage facility is standing empty, the temperature must be maintained at the desired level in expectation of the next shipment which may need it. Also, the location of such a storage facility must be in the cargo handling areas so it is subject to damage from forklifts and other handling equipment. In general, stand alone temperature regulated storage units are uneconomical except at the very largest airports and then only at those terminals where there is a continuous demand for such facilities. It is usually not economical to transport cargo containers several miles to the other side of a large airport just to use a cold storage facility for a few hours. The cost of transporting cargo containers from the point where they are unloaded to the storage facility and loadintg them into that facility can quickly become prohibitive.

Previous expedients which have sought to overcome these and other difficulties of the prior art have been generally unsatisfactory. One previous expedient involved the use of a refrigeration unit which was designed to be transported to an insulated cargo container and strapped over the opening of the container. An opening in one side of the refrigeration unit was intended to match the side of and seal with the opening in the cargo container. Inside the refrigeration unit was equipment which generated cold air. This prior expedient was difficult to use. The presence of irregularities in both the surfaces upon which the container and refrigeration unit rest as well as irregularities in the opening of the container itself, make it difficult to achieve an adequate seal.

SUMMARY OF THE INVENTION

According to present invention, a portable temperature maintenance system is provided in which the temperature of a body of recirculating vapor, preferably air, is maintained at about a predetermined temperature within a generally closed system. The device is portable and includes a carriage member, a conduit member and a panel member. The carriage member incorporates means for regulating the temperature of a body of recirculating vapor. The panel member is positionable independently of the carriage member.

The panel member is generally a lightweight insulated structure which is designed to match with and close the opening of an insulated chamber such as a cargo container. In general, a releaseable locking mechanism for releasably sealing the panel to an opening in a chamber is incorporated into the panel. A seal is provided on the portion of the panel which is intended to mate with the structure that defines the opening in the cargo container. Locking the panel in operative position on the cargo container actuates the seal. The panel is provided with at least one port passing therethrough so as to permit the ingress and egress of vapor. The panel is preferably provided with insulation but is constructed so as to be lightweight as possible. In general, the panel is adapted to be handled and mounted in operable position by one person. The mounting mechanisms are preferably of the quick release type so that no tools are required for their operation. In general, the panel member is mounted to the opening in a chamber such as an insulated cargo container and the carriage member is position nearby with the two being interconnected by flexible conduit members. The flexible conduit members are preferably insulated and served to conduct vapor between the temperature regulating means and the chamber. In general, the temperature regulating mechanisms is a refrigeration unit and vapor returning from the chamber is blown over the coil of the refrigeration unit and is discharged from the downstream side of the refrigeration coil back to the chamber. Preferably the carriage member is supported on wheels and is provided with a tool bar or other attachment means to facilitate its being moved from one location to another. In general, the entire portable temperature maintenance system is constructed of lightweight materials so as to facilitate the portability of the system.

Conventional equipment for operating the system, including thermostats, switches and system monitoring sensors, is provided. Controls and indicators for monitoring the operation of the system are preferably mounted on a control panel in a convenient location on the carriage member. In general, the system is intended to provide its operator with the capability of maintaining about a constant vapor temperature within the system. In general the requirement of portability prevents the unit from developing enough capacity to chill a large body of material in an economically effective period of time. Generally the operator is provided with a choice of at least two operating temperatures, one at approximately 35 degrees Fahrenheit which is suitable for fresh fruits and vegetables. The other generally used operating temperature is approximately 5 degrees Fahrenheit which is suitable for frozen products. Other warmer or colder temperatures maybe provided as desired.

The flexible conduit members are generally provided with some suitable quick release mechanism for attachment to the panel and carriage members. Preferably the carriage member is so constructed that when the portable temperature maintenance system is not in use, all of the component parts are conveniently carried by the carriage member. In this way, the entire system may be transported to the point of usage as a single unit. Preferably the portable temperature maintenance system is powered by an electrical motor, however, diesel or other prime mover power units may be employed, if desired.

BRIEF DESCRIPTION OF THE DRAWINGS

Referring particularly to the drawings for the purposes of illustration only and not limitation, there is illustrated:

FIG. 3 is a perspective view of an embodiment of this invention showing the portable temperature maintenance system in operative position; and FIG. 4 is a partially broken elevational view of an embodiment of the present invention.

DETAILED DESCRIPTION OF THE PREFERRED EMBODIMENTS

Figure 1:
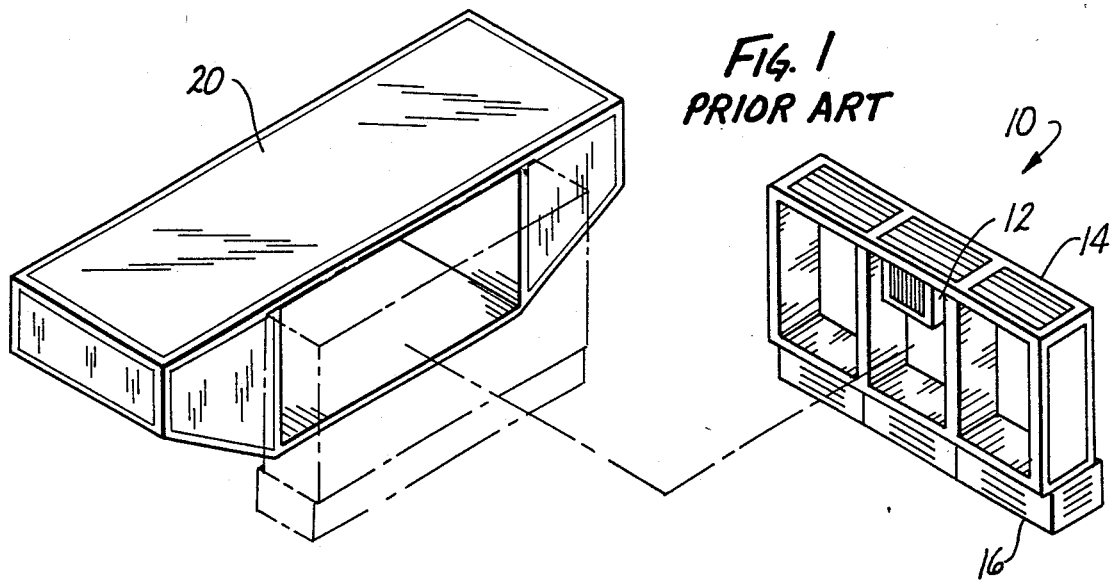
FIG. 1 is a perspective view of a prior art device.

Referring particularly to FIG. 1, there is illustrated generally at 10 a device of the prior art which includes a refrigeration unit 12 that is mounted in a cabinet 14. Cabinet 14 is supported on base 16. Cabinet 14 has an open face which is bounded by edge seals 18. The prior art device 10 is adapted to be strapped to an insulated cargo container 20 so that the open face of cabinet 14 register insofar as possible with the opening in the cargo container 20.

Figure 2:
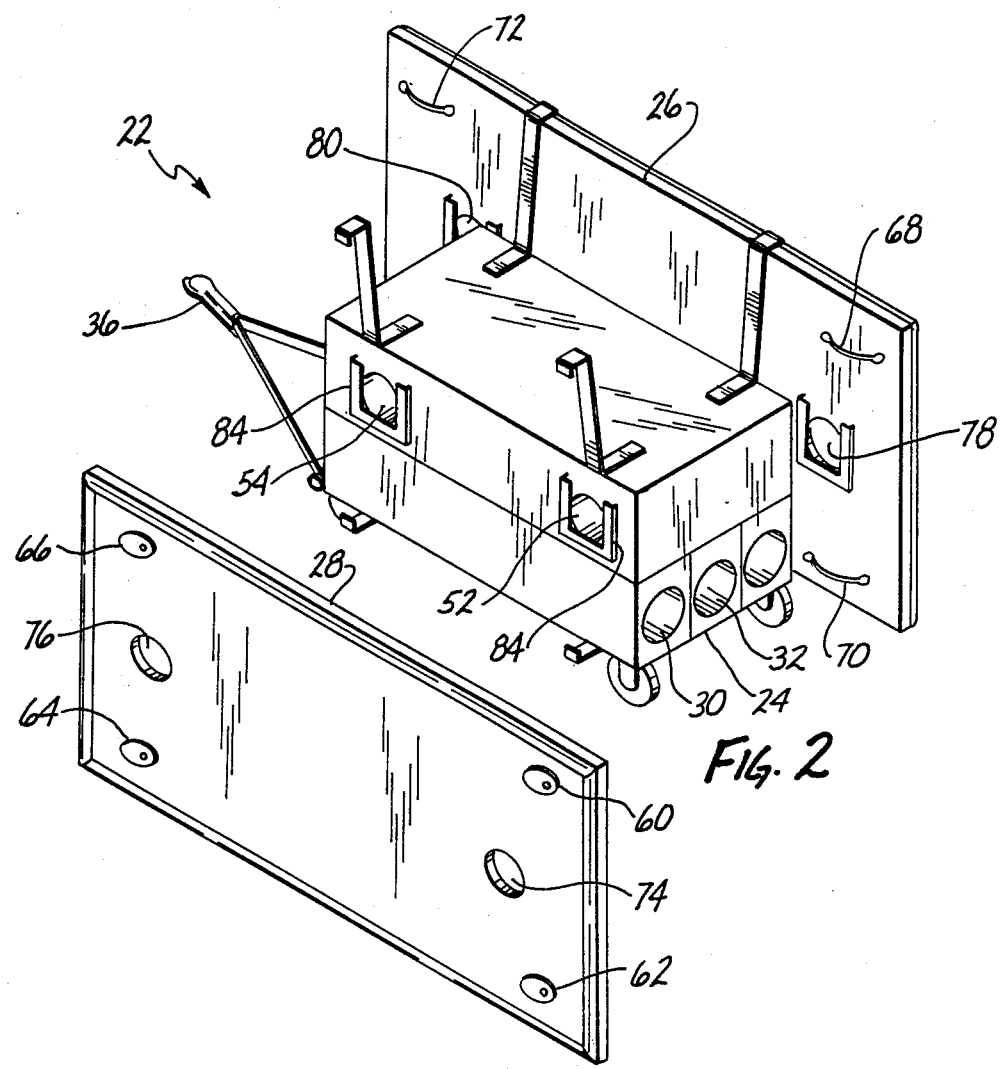
FIG. 2 is a perspective view of a portable temperature maintenance system according to the present invention.

Referring particularly to FIGS. 2–4, illustrated generally at 22 is a portable temperature maintenance system according to the present invention. The portable temperature maintenance system 22 includes a carriage member 24 which is portable and is provided with brackets to carry separate panel members 26 and 28 as well as conduit members 30, 32 and 34. Tow bar 36 is provided for ease in moving carriage member 24 from one location to another.

The upper part of carriage member 24 is in the form of a cabinet 38. Cabinet 38 is divided by refrigeration coil 44 into an intake side 40 and an exhaust side 42. A lower deck 46 of cabinet member 24 provides a convenient location for the mounting of refrigeration unit 48. Conveniently the portion of lower deck 46 which is not required for the positioning of the refrigeration unit 48 provides a location to store the conduit members when they are not in use. A blower 50 is positioned in the intake side 40 of cabinet 38 in such a location that vapor in intake side 40 is forced through refrigeration coil 44. Exhaust side 42 of cabinet 38 is on the down stream side of refrigeration coil 44. Cabinet 38 is provided with openings positioned such that intake opening 52 receives vapor from outside cabinet 38 and exhaust opening 54 discharges vapor from cabinet 38.

In operation, the carriage member 24 is moved to a location adjacent to a chamber where temperature control is required. In the configuration illustrated particularly in FIG. 3, the carriage member 24 is towed into position between insulated cargo containers 56 and 58. The containers are positioned so that the openings in the containers face one another with carriage member 24 between them. The panel members 26 and 28 are removed from their hangers on carriage member 24. The lightweight panel members are positioned in registration with the openings in the respective cargo containers and locked in place. Locking is accomplished by means of locking cams 60, 62, 64 and 68. The locking cams are actuated by means of cam actuating handles which are illustrated for example, at 68, 70 and 72. The cam actuating handles are accessible from the normally outside face of the panel member and the locking cams engage with the structure which defines the opening in the cargo container. The panels are provided with ports 74, 76, 78 and 80. These ports pass through the panels so as to permit the ingress and egress of vapor through the panels.

The assembly of the system for operation is completed by mounting the flexible conduits between the cabinet 38 and the panel members 26 and 28. The flexible conduits are provided at either end with a flat plate indicated, for example, at 82. Flat plate 82 slips into a U-shaped channel 84 which is mounted on the face of a panel member or cabinet 38. The open side of U-shaped channel 84 faces upwardly so that the force of gravity tends to hold flat plate 82 in the fully assembled configuration. In the fully assembled configuration, the flexible conduit member is coaxially aligned at one end with an opening in the cabinet 38 and at the other with a port in a panel member. In a preferred embodiment four flexible conduits are used with two attached on each side of cabinet 38. In this way, two cargo containers are serviced simultaneously from one carriage member.

In the fully assembed configuration, the cargo containers and the cabinet 38 comprise a single substantially closed system in which cold air is generated by contact with refrigeration coil 44 in cabinet 38. The air is caused to circulate by the force of blower 50. The path of circulation extends from the exhaust side 42 of cabinet 38 through a flexible conduit to a port in a panel member. The cold air is discharged from the port in the panel member into the interior of one of the insulated cargo containers. Air circulates from the container back through the other port in the panel member, through the second conduit and into the intake side 40 of cabinet 38. Although it is convenient to utilize two ports in the panel members, it is possible to run two conduits through one port.

It will be understood that the portable temperature maintenance system according to the present invention is capable of servicing various chambers including those where a fixed refrigeration unit is being repaired and it is necessary to maintain the temperature in a cold room while repairs are being accomplished on the fixed refrigeration unit.

What has been described are preferred embodiments in which modifications and changes may be made without departing from the spirit and scope of the accompanying claims.

What is claimed is:

1. A transportable ground system for air-conditioning the interior of an aircraft cargo container of the type having at least one access opening for loading and unloading said container, comprising:

a wheeled carriage, air refrigeration and air circulation means on said carriage including first port means for circulating air through air refrigeration and air circulation means;

at least one panel fully detachable from said carriage, said panel being adapted to fit over and close the access opening of a cargo container to be refrigerated;

locking means on said panel manually actuatable into engagement with the container for holding said panel in substantially sealing relationship with the access opening in the container;

second port means in said panel for circulating air through the interior of the cargo container when said panel is engaged thereto;

flexible air duct means having opposite duct ends, each duct end provided with an end fitting adapted to releasably engage with corresponding fittings on said panel and on said carriage for connecting said first port means with said second port means thereby to recirculate air between said refrigeration means and the cargo container thereby to maintain a controled temperature in the container; and means on said carriage for storing said least one panel and said air duct means fully disconnected from each other and from said first port means.

2. The system of claim 1 wherein said end fittings are the same at each duct end such that either duct end may be interchangeably engaged to said first or said second port means.

3. The system of claim 1 wherein said end fittings comprise plate means transverse to said duct means and said corresponding fittings comprise flange means adapted to slidingly receive said plate means and hold said duct ends in substantially sealing communication with said port means.

4. The system of claim 2 wherein said end fittings comprise plate means transverse to said duct means and said corresponding fittings comprise flange means adapted to slidingly receive said plate means and hold said duct ends in substantially sealing communication with said port means.

5. The system of claim 2 wherein said least one panel is sufficiently lightweight for manual handling between said storage means and a nearby cargo container.

6. The system of claim 2 wherein said locking means are cam locks adapted to engage wall portions of an existing unmodified cargo container for supporting said panel over the access opening.

7. A transportable ground system for air-conditioning the interior of an existing unmodified aircraft cargo container of the type having at least one access opening for loading and unloading said container, comprising:

a wheeled carriage, air refrigeration and air circulation means on said carriage including first port means for circulating air through said air refrigeration and air circulation means;

a pair of panels each fully detachable from said carriage, each said panel being adapted to fit over and close the access opening of a cargo container to be refrigerated;

locking means on each said panel manually actuatable into engagement with a cargo container for holding each of said panels in substantially sealing relationship over the access opening in a corresponding cargo container;

second port means in said panel for circulating air through the interior of said corresponding cargo container when said panel is engaged thereto;

a plurality of flexible air ducts each having opposite duct ends, each duct end provided with an end fitting adapted to releasably engage with corresponding fittings on said panels and on said carriage for connecting said first port means with said second port means thereby to recirculate air between said refrigeration means and the corresponding cargo container or containers associated with one or both of said panels for maintaining a controled temperature in the container or containers, said end fittings being the same at each duct end such that either duct end may be interchangeably engaged to said first or said second port means; and means on said carriage for storing both panels and said air ducts fully disconnected from each other and from said first port means.

* * * * *